US006219836B1

(12) United States Patent
Wells et al.

(10) Patent No.: US 6,219,836 B1
(45) Date of Patent: Apr. 17, 2001

(54) PROGRAM MANAGEMENT METHOD AND APPARATUS FOR GAMING DEVICE COMPONENTS

(75) Inventors: Bill Wells; Ernest Baragar, both of Reno, NV (US)

(73) Assignee: International Game Technology, Reno, NV (US)

( * ) Notice: Subject to any disclaimer, the term of this patent is extended or adjusted under 35 U.S.C. 154(b) by 0 days.

(21) Appl. No.: 09/172,743

(22) Filed: Oct. 14, 1998

(51) Int. Cl.[7] .......... G06F 9/445
(52) U.S. Cl. .......... 717/11; 463/25; 463/27
(58) Field of Search .......... 717/11, 2; 463/25, 463/27, 18, 42

(56) References Cited

U.S. PATENT DOCUMENTS

| | | | | |
|---|---|---|---|---|
| Re. 35,864 | * | 7/1998 | Weingardt | 463/28 |
| 4,305,148 | | 12/1981 | Deglin | 370/58 |
| 4,648,063 | | 3/1987 | Strout | 364/900 |
| 5,142,624 | | 8/1992 | Patrick, II | 395/200 |
| 5,326,104 | * | 7/1994 | Pease et al. | 463/18 |
| 5,445,295 | | 8/1995 | Brown | 221/3 |
| 5,467,609 | | 11/1995 | Feeney | 62/259.2 |
| 5,539,304 | | 7/1996 | Payne et al. | 324/74 |
| 5,593,349 | | 1/1997 | Miguel et al. | 463/30 |
| 5,759,102 | | 6/1998 | Pease | 463/42 |
| 5,836,817 | * | 11/1998 | Acres et al. | 463/26 |
| 5,851,149 | * | 12/1998 | Xidos et al. | 463/42 |
| 5,885,158 | * | 3/1999 | Torango et al. | 463/27 |
| 5,963,743 | * | 10/1999 | Amberg et al. | 717/11 |
| 6,038,399 | * | 3/2000 | Fisher et al. | 717/11 |
| 6,050,895 | * | 4/2000 | Luciano, Jr. et al. | 463/7 |
| 6,071,190 | * | 6/2000 | Weiss et al. | 463/25 |
| 6,104,876 | * | 8/2000 | Branson et al. | 717/2 |
| 6,126,542 | * | 10/2000 | Fier | 463/16 |

OTHER PUBLICATIONS

Title: Gaming Language: Getting a Handle on Slots, author: Brewer et al, 1995, Cornell University.*

Title: IBM & Record Giants to Demonstrate System to Deliver, Music lively on Net, Wall Street Journal, Feb. 8, 1999, By Eben Shapiro.*

* cited by examiner

*Primary Examiner*—Kakali Chaki
*Assistant Examiner*—Chameli C. Das
(74) *Attorney, Agent, or Firm*—George H. Gerstman; Seyfarth Shaw

(57) ABSTRACT

A system for electronically downloading and verifying programs directly to printed circuit board components for use in gaming devices is provided. The downloading is preferably based on stored customer orders and provides reduced potential for errors arising by automating some or all features of program selection and by preferably implementing one or more steps of verifying programs for approval or compliance with gaming jurisdiction regulations for a jurisdiction where the gaming device is intended to be used.

21 Claims, 3 Drawing Sheets

PROGRAM MANAGEMENT METHOD AND APPARATUS FOR GAMING DEVICE COMPONENTS

Cross-reference is made to U.S. Ser. No. 09/088,205, filed Jun. 1, 1998 which is a continuation of Ser. No. 08/600,311, now U.S. Pat. No. 5,759,102 (for "PERIPHERAL DEVICE DOWNLOAD METHOD AND APPARATUS"), filed Feb. 12, 1996, both incorporated herein by reference.

The present invention relates to a method and apparatus for managing programs for downloading to gaming device components such as during gaming terminal manufacture or assembly processes.

BACKGROUND INFORMATION

Many current gaming machines are configured with electronic components, commonly mounted on one or more printed circuit boards (PCBs). Many such electronic components use programming or other information stored in memories. In at least one typical configuration, a gaming terminal or gaming machine will include a controller board, a communications board or module, and one or more so-called peripheral boards such as a display controller board, a currency acceptor board, a coin handler board, and the like. Typically at least one board, such as the game controller board, include a processor (microprocessor) or other computer unit which often operates based on programming or other information (software or firmware) stored in a memory such as one or more electronically erasable programmable read-only memories (EEPROMs). Such software or firmware may be programmed or stored in the memory locations during the manufacturing or assembly of the gaming device. Additionally, software or firmware may be provided to replace or supplement the software or firmware in a gaming device which is in operation (in the field), e.g. features, new games and the like, and/or to correct programming errors. In either case, the new firmware or software is transferred or "downloaded" from a source (which may be, e.g., a computer such as a workstation personal computer, laptop computer, and the like) to the "target" memory in a particular gaming device or machine.

Although downloading from one computer to another is, in general, a process that is currently known, downloading software or firmware to components of gaming devices presents particular problems not readily addressed by conventional downloading techniques. One feature applicable to gaming device downloading is the stringent regulatory oversight and control exercised by regulatory authorities in many jurisdictions. In many, and perhaps all, regulated gaming jurisdictions, downloading of software or firmware to a gaming device should provide some assurance that the new software or firmware will comply with local regulations for the jurisdiction where the device will be located.

In the strict regulatory environment for many gaming devices, it is typically necessary to provide assurance that approved and proper software is provided in the peripheral and other boards, in addition to that provided on the game controller board. For example, a gaming regulatory authority in one jurisdiction may require assurance that, e.g., bill acceptor software will be appropriate (and approved) for that jurisdiction (and will not, e.g., run the risk of downloading bill acceptor software that was approved in a different jurisdiction).

Accordingly, it would be advantageous to provide a program management system that reduces or eliminates the potential incorrect downloads and/or verifies jurisdiction approvals for downloaded software.

It is also commonly found that gaming devices occur in a wide variety of configurations, such as employing numerous different types of processors, memories, game configurations, versions and types, peripheral hardware and software and the like. Such differences may not be apparent (or may be discemable only with difficulty) from a visual inspection of the gaming device, its components, or its operation. For this reason, when it is desired to download software to a particular gaming device, it is typically necessary, in current systems, to manually select a particular software version for downloading, bearing in mind e.g., the type of hardware found on particular gaming devices, the items request by one customer and jurisdictional approvals that have been given to various software versions, lest the newly-downloaded software is incompatible with the gaming device or results in operation which is not approved by a particular jurisdiction. This situation is particularly burdensome in the context of gaming devices in which it is sometimes necessary or desirable to load programming in a large number of devices in a relatively short amount of time.

Accordingly, it would be advantageous to reduce or eliminate the requirement (or the ability) of an operator to manually select which software is to be loaded on a particular memory or component.

When the manufacture or assembly of gaming devices involves storing or loading software or firmware into components of the gaming device, previous approaches have typically used partially or fully manual methods for such loading of software or firmware. For example, in previous systems, a technician, typically would use a written purchase order or work order as a basis for selecting which programs are to be loaded, and would manually enter the file name or other program information in order to initiate downloading. EEPROMs which are manually programmed in this fashion are typically then moved to the production floor where they are inserted into printed circuit boards (PCB) assemblies. The PCB assemblies are then inserted or placed in terminals as part of the assembly process.

Such manual loading of software or firmware has a number of disadvantageous aspects. Such manual loading involves a relatively large investment of time and effort typically by skilled personnel, and thus results in relatively high expense. At least partially as a result of the number of manual steps involved, and particularly those which require matching the software to components or hardware, there is a relatively high potential for errors, such as providing gaming devices with the wrong programs, configured for the wrong customer, provided with incorrect components or assemblies and the like.

Accordingly, it would be advantageous to provide a system which facilitates fully or partially automatic downloading and management of the programs for gaming devices.

In a typical situation, there is often a delay of some weeks or months between the time a customer places an order and the time the gaming device assembly is completed. Not uncommonly, development may be taking place with respect to some or all of the software to be used in such gaming devices. Although it would be desirable, in some regards, to always load a product with the most recent (and presumably best or most advanced) versions of a software package, it may be that software improvements made between the order date and final assembly date have not been approved for all jurisdictions and, accordingly, in previous systems, it was necessary, in order to assure loading of the best permissible software version, to manually check jurisdictional approvals for various versions of available software, bearing in mind the intended jurisdictional location of a particular gaming device. Accordingly, it would be advantageous to provide a system in which the most recent software version which has been approved for a particular jurisdiction will be selected automatically (without the need for manual analysis or selection).

In typical systems currently used, there is little or no record keeping with respect to hardware or software components that are used in particular gaming devices. As a result, for purposes such as repair, maintenance, warranty and the like, current systems often require expensive and time-consuming manual identification of such hardware or software components. Accordingly, it would be useful to provide a program management system which included the potential to produce and maintain databases identifying hardware and/or software components associated with particular gaming devices, preferably in a manner which is substantially automatic (i.e. without requiring manual entry into the database of component identification information).

SUMMARY OF THE INVENTION

The present invention provides for reliably and securely loading programming or other information, in the manufacture or assembly of one or more gaming devices. In one embodiment, the system provides links between the computer systems of various departments, including but not limited to Engineering, Product Assurance (jurisdiction approvals) and Production, e.g. to allow communication and verification of information maintained in databases of the different departments. Orders for programming are automatically validated to, among other items, assure proper development within Engineering and jurisdictional compliance and approval within Product Compliance. Validated orders are sent to production. The system automatically selects the proper software to download, so as to produce a gaming device configured to comply both with a customer's order and to assure jurisdictional approval. Preferably, following download, the gaming device or components are queried to verify the board contents (and the jurisdictional approval) prior to shipping the gaming device.

DETAILED DESCRIPTION OF THE PREFERRED EMBODIMENT

Figure 1:
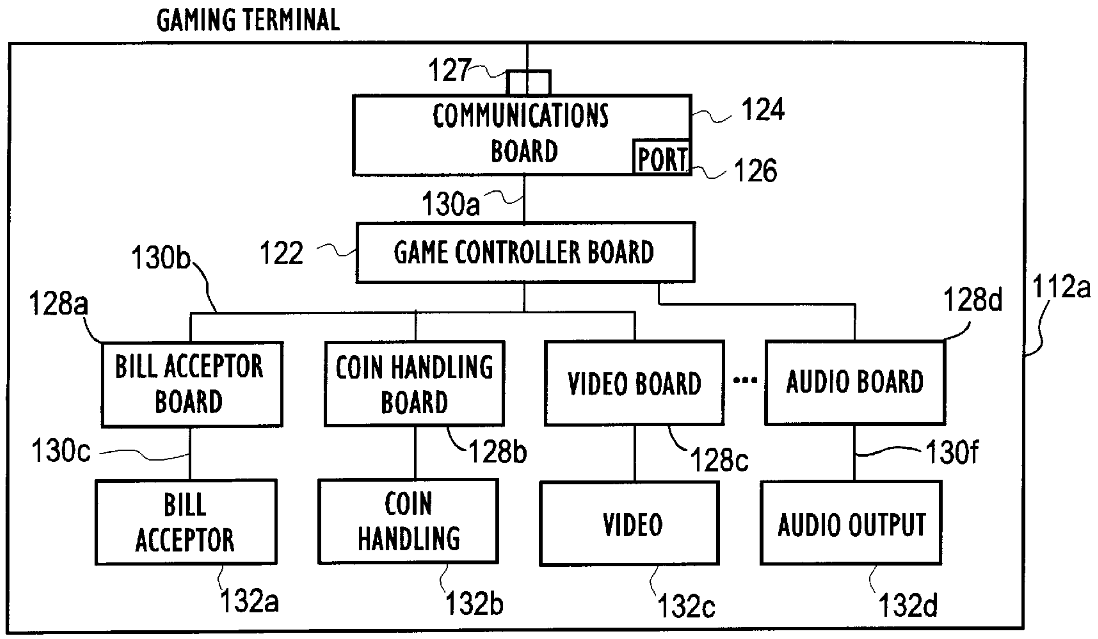
FIG. 1 is a block diagram of a gaming device of a type which may be programmed in accordance with an embodiment of the present invention.

The present invention can be used in connection with many types of gaming devices. FIG. 1 provides an illustration in block diagram form of one such gaming device. In the embodiment of FIG. 1, a gaming device (or gaming terminal) 112*a* includes a game controller board 122 which will typically include, among other items, a microprocessor and a memory such as an EEPROM storing programming and/or other information for controlling operation of the controller board 122. In one embodiment, the processor 1110*a* is an Intel Multimedia/Super Computer processor model 80960, although the invention can be used in connection with computing devices having other types of processors and in connection with gaming terminals which are controlled by devices other than microprocessors such as ASICs. Typically the hardware and software of the game controller board 122 will contain the information defining the type of game and making determinations of the win/loss local outcome (as opposed to, e.g., a progressive win/loss outcome) for the gaming device 112*a*. Because of the central role of the game controller board 122 in determining any monetary payout, it is particularly important to assure the presence of the correct software for the game controller board to avoid improper or incorrect payouts and to assure compliance with local regulatory authorities. Although it is possible to combine numerous functions onto a given board, typically numerous boards will be provided in a gaming device for forming a plurality of functions. In the depicted embodiment, the game controller board communicates with a communications board 124 which provides information to and, receives the information from a local controller and/or central computer, for purposes such as monitoring use and performance, assuring compliance, performing accounting and similar functions, and facilitating implementation of progressive or other multi-terminal based games or prizes. In one embodiment, the communications board 124 includes one or more ports by which a laptop or other computer may be coupled to the gaming device 112*a*. In the embodiment of FIG. 1, a plurality of peripheral boards 128*a–d* communicate with the game controller board 122 and control various peripheral devices for performing various functions such as bill acceptor functions 132*a*, coin handling functions 134*a*, 132*b*, video functions 132*c* and audio output functions 132*d*. In many configurations, some or all of the peripheral and other boards 128*a–d*, 124 will contain flash memory, EEPROMs or other devices for storing software or firmware for running on microprocessors or other computing devices on such boards. In the depicted embodiment, each gaming device includes a processor, one or more memories and a communications module 124.

Figure 4:
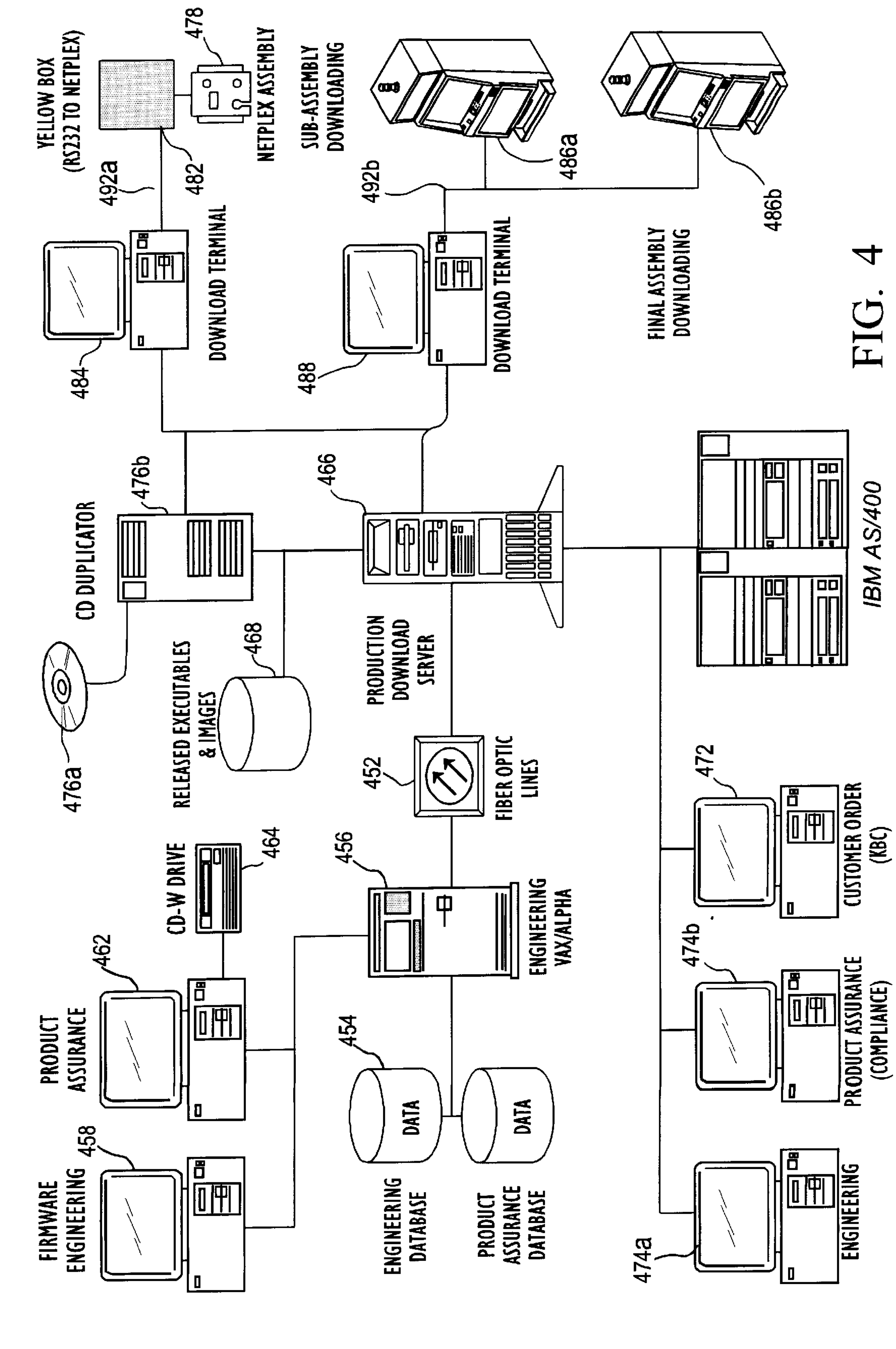
FIG. 4 is a block diagram of a gaming device manufacturing and assembly system according to an embodiment of the present invention.

FIG. 4 depicts a system usable in subassembly or final assembly downloading, e.g., in a gaming device manufacturing environment. FIG. 4 includes a plurality of computers such as workstation computers, network server computers, and/or PC-type computers coupled by network lines such as fiber optic lines 452 in a manner well-known to those of skill in computer network technologies.

At various stages in employing the system of FIG. 4, programming data or other information is stored in a number of different storage systems such as databases (typically providing storage on hard drives or other well-known storage media). In the depicted embodiment, during program design process, information is held in an engineering database 454. Software and firmware engineers use and modify such information via computers 456, 458 having at least indirect access to engineering database 454. Preferably, programs or other data which are still in the development phase are restricted to the engineering database 454 and are not stored in other databases. At some point, engineering will release the program or other information to product assurance 462 which, after review, will submit the programming or data (e.g. via writing on a CD 464) to a gaming jurisdiction for approval. After the program or data is approved by the gaming jurisdiction, the program is copied to a production download server 466 and, preferably, stored in a "released" database 468. Information about the approved program is provided to a customer order system 472 and other systems such as engineering 474*a* and product assurance 474*b*.

Although released programs may be provided in various forms such as on CD ROM 476 (via a CD duplicator 476*b*), FIG. 4 also illustrates a system for downloading programming data or other information as part of a gaming device assembly or fabrication system. The programming or data may be loaded onto boards or other subassemblies 478, e.g. via a translator/power assembly 482 and download terminal 484 or may be loaded into one or more gaming devices 486*a,b*, e.g. via connection to a communication board for downloading, in turn, to target peripheral devices or other subassemblies within the gaming devices 486*a*, 486*b*, e.g. via a download terminal 488.

In the strict regulatory environment for many gaming devices, it is typically necessary to provide assurance that only approved and proper software and data is used in the gaming devices, including peripheral and other boards (in addition to that provided on, e.g., the game controller board). Depending on the nature of the download, it will be advantageous, in performing assembly line downloading, to recognize or distinguish different boards, e.g. to obtain information regarding characteristics of the board and/or its identity or history.

In the environment of the system of FIG. 4, a host device such as the download terminal 484 connects directly to the subassembly or through a test box 482 that provides the physical connection and power. A download terminal 488 can also be used to download information to boards which have already been assembled into gaming devices 486*a,b* (which, provide physical connection and power and thus can be used for downloading without a test box 482). The host device 484, 488 can be network-connected as depicted or can be a standalone device. In a standalone configuration, the program information can be stored on a CD ROM 476*a* or other storage medium. The depicted download system can be used on the production floor as depicted or at a service bench, e.g. for repair purposes. Preferably the download media 492*a*, 492*b* are configured to facilitate downloading of information and can thus be configured or optimized to achieve relatively high rates of data transfer.

Figure 2:
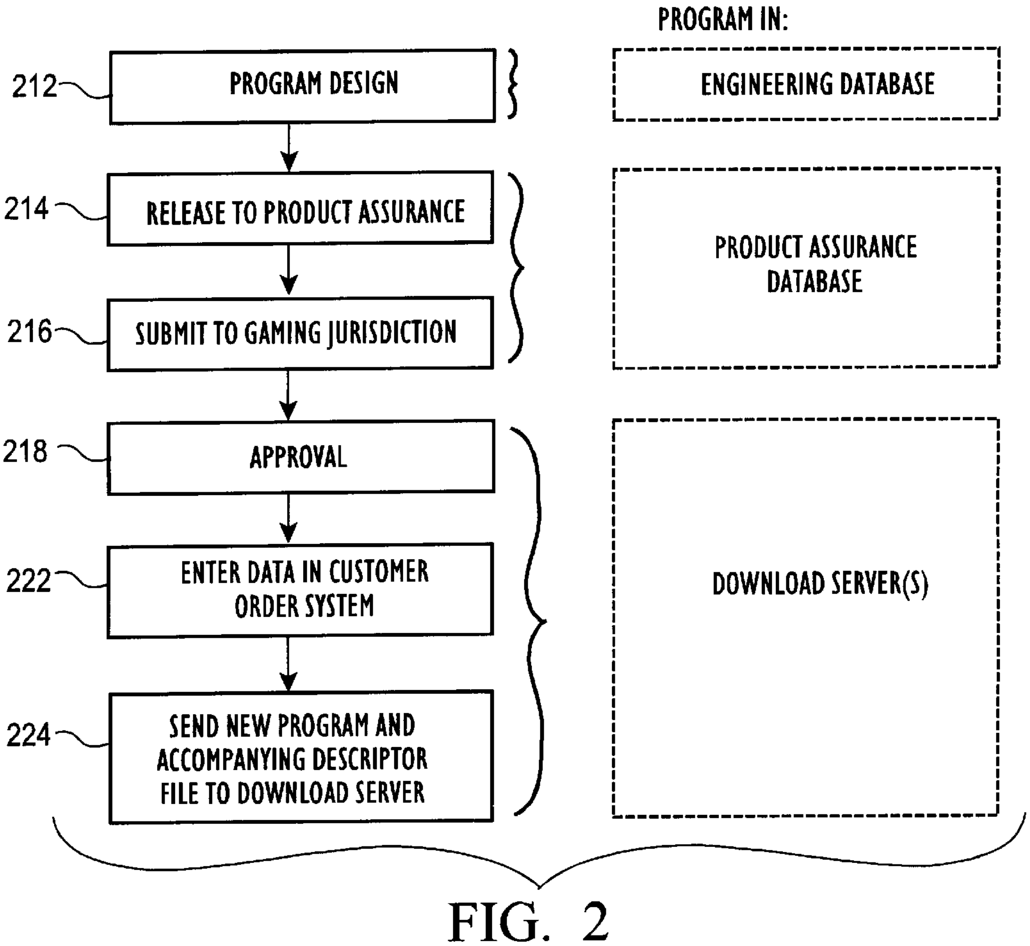
FIG. 2 is a flow chart of a process according to one embodiment of the present invention.
Figure 3:
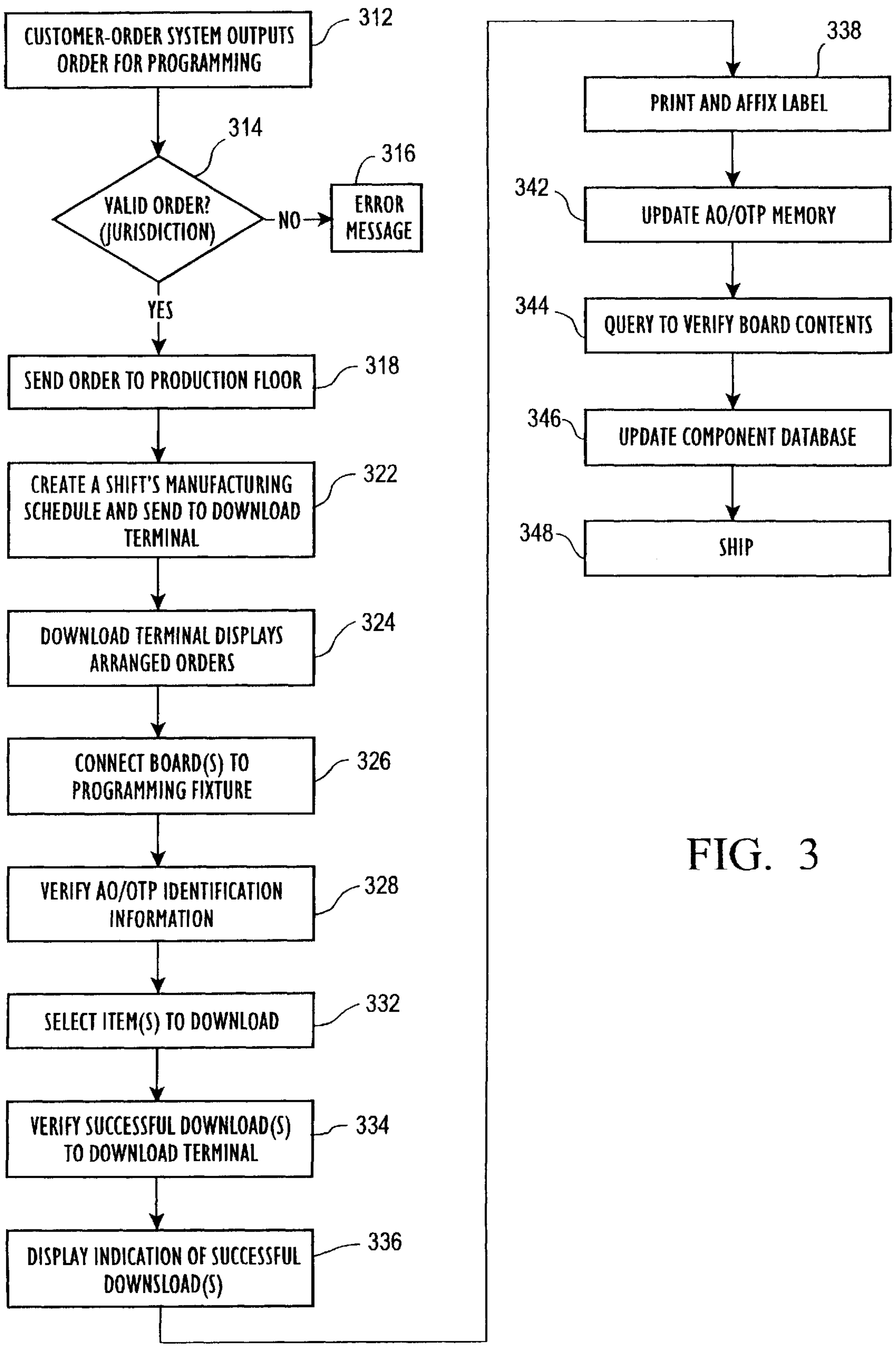
FIG. 3 is a flowchart of a process according to one embodiment of the present invention.

In order to facilitate security in downloading information, preferably so as to achieve approval for such downloading by gaming regulatory bodies, a downloading process as depicted in FIGS. 2 and 3 may be used. During program design/revision processes, the data (programs and the like) are held in the engineering database 454. As depicted in FIG. 2, following program design, the program is released to product assurance 214, at which time it is moved to the product assurance database 455. The software is then submitted to one or more gaming jurisdictions 216 for approval. After approval 218, the program accompanying scripted file or other data is copied to the production download server 466 and information about the data is entered into a customer order system 472, 224. At this point, the system is in a state such that the newly-developed and approved software can be loaded, as needed, in accordance with particular customer orders.

FIG. 3 depicts a process for loading software in response to customer orders. In the embodiment depicted in FIG. 3, a customer order system 472 outputs an order for programming 312 such as an order for a quantity of a specific assembly (a particular type of PCB) to be programmed. Preferably, the order includes a programming request and jurisdictional usage information. The order output by the customer order system 472 is verified by the production download server 466 to determine whether it is a valid order 314. Preferably, validation 314 includes at least a check to determine whether the programming that has been requested is programming that has been approved for a jurisdiction which is in accordance with the use location for the gaming device specified in the customer order. If the order is not valid, an error message or other error indicator is output 316 for handling by an error handling routine or for manual analysis or intervention. If the order is valid, it is then sent 318 to the production floor 484–486. In the process depicted in FIG. 3, the production download server 466 will then provide a manufacturing order schedule, e.g. a schedule for a day or shift, which will then be sent 322 to one or more download terminals 484, 488. Preferably the download terminals 484, 488 outputs a display showing the orders for a day's production which may be arranged in a number of manners such as by assembly number, program number, manufacturing order number and the like 324.

As noted above, software may be downloaded to particular assemblies (PCBs) using an assembly connector 478 or may be downloaded to components already installed in gaming devices 486*a*, 486*b* or both. In either case, an operator connects at least one and preferably several assemblies or gaming devices e.g. via connectors 478 and/or cables 492*b*, 326. In some configurations, it will be desirable to obtain component identification information such as that stored on add-only/one-time programmable (AO/OTP) memory or memory portions coupled to or associated with assemblies, components or gaming devices 328.

After the components or gaming devices are coupled and identification information is optionally obtained, the operator selects 332, preferably from a menu on the download terminal screen, the item or items that are to be downloaded. In contrast with previous methods, it is not necessary for the operator to identify or input a particular file name or other indicator.

Preferably, this selection is performed automatically by the download terminal or download server. Such automatic selection is performed preferably by determining the configuration of the gaming device which has been ordered by the customer and automatically selecting the software appropriate for such configuration. For example, if the customer had ordered a blackjack-style gaming device with a bill acceptor, and card reader, the download computer will determine on the basis of this order that it will be necessary at least to download blackjack gaming software onto a controller board, bill acceptor software onto a bill acceptor board, and card reader software onto a card reader board. The download computer will select, from among the various blackjack, bill acceptor and card reader software available, that software which is appropriate, namely the software which is the most recent version of the selected software which has been approved for the jurisdiction for which that gaming device has been ordered and which is otherwise appropriate (such as being compatible with the particular type of microprocessor or other hardware that will be used in the gaming device).

In many situations, it is anticipated that several devices with similar configurations may be requested such that the download terminal, as a result of this process, may display, e.g., eight identical bill acceptor downloads or the like. In one embodiment, simultaneous download to a plurality of devices is enabled or facilitated when all such devices are to receive the same software. Accordingly, in these configurations, preferably the operator will couple a plurality of boards or gaming devices which may be programmed at the same time. Upon selection of the items to download, the system will automatically download the appropriate software or other information to the connected assemblies or gaming devices.

Downloading can be performed in a number of fashions, including that described in U.S. application Ser. No. 09/172,786 (Attorney File No: 3735-923) for "METHOD FOR DOWNLOADING DATA TO GAMING DEVICES". In one embodiment, a gaming identification apparatus and system can be used in accordance with that described in U.S. patent application Ser. No. 09/172,787 Attorney File No. 3735-924 for "GAMING DEVICE IDENTIFICATION METHOD AND APPARATUS" filed on even date herewith and incorporated herein by reference).

Many types of data transfer can be used including serial and parallel transfer. In one embodiment, the data is transmitted in a block fashion, i.e., by transmitting a predetermined number of bits of the information (such as 1024 bits) from the source to the gaming device, and then checking for errors in the block. As will be well-known to those of skill in the art, other block lengths can also be used. In one embodiment, verification or other checking is performed to assist in detecting data transmission or other errors. A number of well-known verification or error detection schemes can be used, such as a CRC. One type of CRC check is described in U.S. patent application Ser. No: 08/348,268, filed Nov. 30, 1994, for "METHOD AND APPARATUS FOR VERIFYING THE CONTENTS OF A STORAGE DEVICE" (incorporated herein by reference). This or other verification or error checking schemes can be adapted for use in the present invention in a manner that will be apparent to those of skill in the art, after understanding the present disclosure.

If there are errors detected in the block of information (using, e.g. a cyclic redundancy check error detection routine, or other error detection routines well-known to those of skill in the art), the procedure may retransmit the block.

Following such a final CRC check, the download terminals 484, 488 are provided with information verifying the successful download 334. The display of orders for this work shift is modified to reflect an indication of the successful downloads 336 to permit operators to distinguish those downloads that have been completed from those that remain still to be done.

Preferably, the download terminals 484, 488 will output commands to print labels 338 identifying the items that have been downloaded which are then affixed to the appropriate components (boards). Labels can include information such as component or assembly number, program number or version, date of downloading and other relevant manufacturing information. In some configurations, AO/OTP memory, or other types of memory, residing on the board are programmed or written-to in order to store information indicating the software version that has been downloaded, serial number, manufacturing date, downloading date, or similar information, e.g. regarding the characteristics of the component or terminal 342.

By proceeding in this manner, gaming devices are provided which may be at least partially automatically programmed in a manner which provides a high degree of confidence that the programming complies with both the orders placed by customers and regulations governing gaming devices in the jurisdiction for which the gaming devices are intended.

In a typical situation, there will be some amount of delay between the completion of gaming device manufacture or assembly and the time in which the gaming devices are shipped to customers. Preferably, before the time the devices are shipped to customers, the devices, via connections **492*b* to a download terminal 488 or similar terminal are queried, automatically, to obtain information on the software residing on the gaming devices as a result of a previous download process. The identity of the software obtained as a result of such queries is then compared with information e.g. on the customer order computer 472 or download server 466 to verify, e.g. prior to shipping, that the software which is present conforms to the order placed by the customer to whom the device will be shipped and/or with the regulatory requirements for the jurisdiction where the gaming device will be located 344. Preferably, at some point before the gaming device is shipped, information about the configuration of the gaming device (such as the software versions which are present, the hardware configuration of the gaming device, gaming device or component identification or serial numbers and the like) are stored in a database e.g. for use in future repairs, warranty work updates, or the like. This information may be information which is obtained in the course of performing the initial download or information obtained at a later query 346**.

In light of the above description a number of advantages of the present invention can be seen. The present invention makes it feasible to reduce or eliminate the need for manual operations in connection with program downloading, while maintaining a high level of security and reliability. The present invention facilitates monitoring and updating the status of programs and jurisdictional approval in real time by a customer order management system. Preferably, machine configurations will be automatically updated to reflect the programs and assemblies actually installed. Machines can be verified for hardware and software revisions against a desired configuration in the final state of the production or shipping process. Preferably, the system is partially or fully automated using a download server and automated factory control system. The system could provide programmed inventory status in real time. The present invention provides the ability to query a gaming device to obtain hardware and software information e.g. for regulatory, inventory, and similar purposes. The present invention makes it feasible to download information to one or many machines at the same time. The present invention is useful in facilitating the standardization of programming or other data, and maintaining a database of programming or other data, across a variety of gaming devices.

A number of variations and modifications of the invention can be used. In general, it is possible to use some features of the invention without using others. For example, it is possible to provide automatic selection and/or downloading of data without providing a subsequent verification step, or vice versa. Although the system provides for automatic (non-manual) procedures for assuring compliance with gaming jurisdiction regulations, it is possible to configure the system to permit manual gaming jurisdiction compliance verification, in place of or in addition to automatic verification compliance e.g. for additional security, for compliance with regulations or regulatory authorities, and the like. The system can be configured to permit customer orders to be processed remotely such as by a telephone or other communication link, from customer premises. For example, bonus game, graphics, sound, and peripheral programs, which typically are less strictly regulated (not determining win/loss or prize outcomes of a game), can be sent from e.g.

the download server to a central or local system for downloading to existing machines. Preferably, the customer order system, in addition to being used to assure fulfillment of orders and compliance with regulations, can be used in connection with scheduling and tracking of orders and programs, preferably in an automatic or partially automatic fashion. Preferably when a program is generated by engineering, a descriptor file is also prepared which includes indications of jurisdictions where the program has been approved or is intended for use. The descriptor file contains information that can be used in connection with verifying gaming jurisdictional approval and the like.

In addition to downloading computer program information, the invention can be used to download data such as data which defines the manner in which peripherals accept currency (or detect counterfeiting).

The present invention, in various embodiments, includes components, methods, processes, systems and/or apparatus substantially as depicted and described herein, including various embodiments, subcombinations, and subsets thereof. The present invention, in various embodiments, includes providing devices and processes in the absence of items not depicted and/or described herein or in various embodiments hereof, including in the absence of such items as may have been used in previous devices or processes, e.g. for achieving ease and reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended the appended claims be construed to include alternative embodiments to the extent permitted.

What is claimed is:

1. A computer-implemented system for use in downloading software during manufacture of gaming devices, comprising:

electronic memory locations storing information including:

first information regarding customer orders for gaming devices, including information about the location where said gaming devices are to be used and also storing a plurality of programs for use in gaming devices including at least a first program approved in a first jurisdiction and a second, different program approved in a second jurisdiction, and second information indicating that said first program is approved in said first jurisdiction and that said second program is approved in said second jurisdiction;

at least a first component for a gaming device, having a component memory, said component being coupled to a computer, said computer being programmed to:

receive information regarding the type of programming for downloading to said component memory;

select among said plurality of programs to identify a program which has been approved for a jurisdiction which includes a location where said gaming device is to be used, to provide at least a first selected program; and download said selected program to said component memory.

2. A computer-implemented system as claimed in claim 1 wherein said plurality of programs is selected from the group consisting of gaming programs and gaming device peripheral device programs.

3. A computer-implemented system as claimed in claim 1 wherein said first component is a gaming device printed circuit board.

4. A computer-implemented system as claimed in claim 1 wherein said component is coupled to said computer by being mounted in a gaming device wherein the gaming device is coupled to said computer by a network connection coupled to a communications board of said gaming device.

5. A computer-implemented system as claimed in claim 1 wherein said component is coupled to said computer via a component power and signal-connection device.

6. A computer-implemented system as claimed in claim 1 wherein said computer selects said first selected program by a process which includes comparing said first information and said second information.

7. A computer-implemented system as claimed in claim 1 wherein said computer receives said information by a process which includes receiving an indication of a particular customer order from among said first information.

8. A computer-implemented system as claimed in claim 1 wherein said computer receives said information by a process which includes automatically identifying characteristics of said component.

9. A computer-implemented system as claimed in claim 8 wherein said computer selects said first selected program by a process which includes verifying that said selected program is compatible with said characteristics of said component.

10. A computer-implemented system as claimed in claim 1 wherein at least a second gaming device component is coupled to said computer.

11. A computer-implemented system as claimed in claim 10 wherein said computer is programmed to permit substantially simultaneous downloading of said selected program to at least said first and second gaming device components.

12. A computer-implemented method for downloading software during manufacture of gaming devices, comprising:

storing, in electronic memory, first information regarding customer orders for gaming devices, including information about the location where said gaming devices are to be used and also storing, in electronic memory, a plurality of programs for use in gaming devices including at least a first program approved in a first jurisdiction and a second, different program approved in a second jurisdiction, and storing, in electronic memory, second information indicating that said first program is approved in said first jurisdiction and that said second program is approved in said second jurisdiction;

coupling at least a first component for a gaming device, having a component memory, to a computer;

receiving information, in said computer, regarding the type of programming for downloading to said component memory;

using said computer to select among said plurality of programs to identify a program which has been approved for a jurisdiction which includes a location where said gaming device is to be used, to provide at least a first selected program; and downloading said selected program to said component memory.

13. A computer-implemented method as claimed in claim 12 wherein said step of coupling said component comprises mounting in a gaming device wherein the gaming device is coupled to said computer by a network connection coupled to a communications board of said gaming device.

14. A computer-implemented method as claimed in claim 12 wherein said step of coupling said component comprises coupling via a component power and signal-connection device.

15. A computer-implemented method as claimed in claim 12 wherein said step of selecting said first selected program comprises comparing said first information and said second information.

16. A computer-implemented method as claimed in claim 12 wherein said step of receiving said information comprises receiving an indication of particular customer order from among said first information.

17. A computer-implemented method as claimed in claim 12 wherein said step of receiving said information comprises automatically identifying characteristics of said component.

18. A computer-implemented method as claimed in claim 17 wherein said step of selecting said first selected program comprises verifying that said selected program is compatible with said characteristics of said component.

19. A computer-implemented method as claimed in claim 12, further comprising verifying the identity of downloaded software after said computer downloads said selected program.

20. A computer-implemented method as claimed in claim 12, further comprising storing, in a database, information identifying said selected program, coupled to information identifying said gaming device component.

21. A computer-implemented method as claimed in claim 12 wherein said step of downloading comprises substantially simultaneous downloading of said selected program to at least said first and a second gaming device component.

* * * * *

UNITED STATES PATENT AND TRADEMARK OFFICE

CERTIFICATE OF CORRECTION

PATENT NO. : 6,219,836 B1
DATED : April 17, 2001
INVENTOR(S) : Wells et al.

It is certified that error appears in the above-identified patent and that said Letters Patent is hereby corrected as shown below:

Title page,
Item [56], References Cited, U.S. PATENT DOCUMENTS, "6,104,876" should be -- 6,104,874 -- and add -- 3,845,472 --.

Column 2,
Line 8, "discemable" should be -- discernable --.

Column 11,
Line 16, after "of", insert -- a --.

Signed and Sealed this

Twenty-sixth Day of March, 2002

*Attest:*

JAMES E. ROGAN
*Director of the United States Patent and Trademark Office*

*Attesting Officer*